Jan. 26, 1965  J. T. ZELLERS, JR  3,167,191
GLASS BATCH FEEDING APPARATUS AND METHOD
Filed Nov. 13, 1962  3 Sheets-Sheet 1
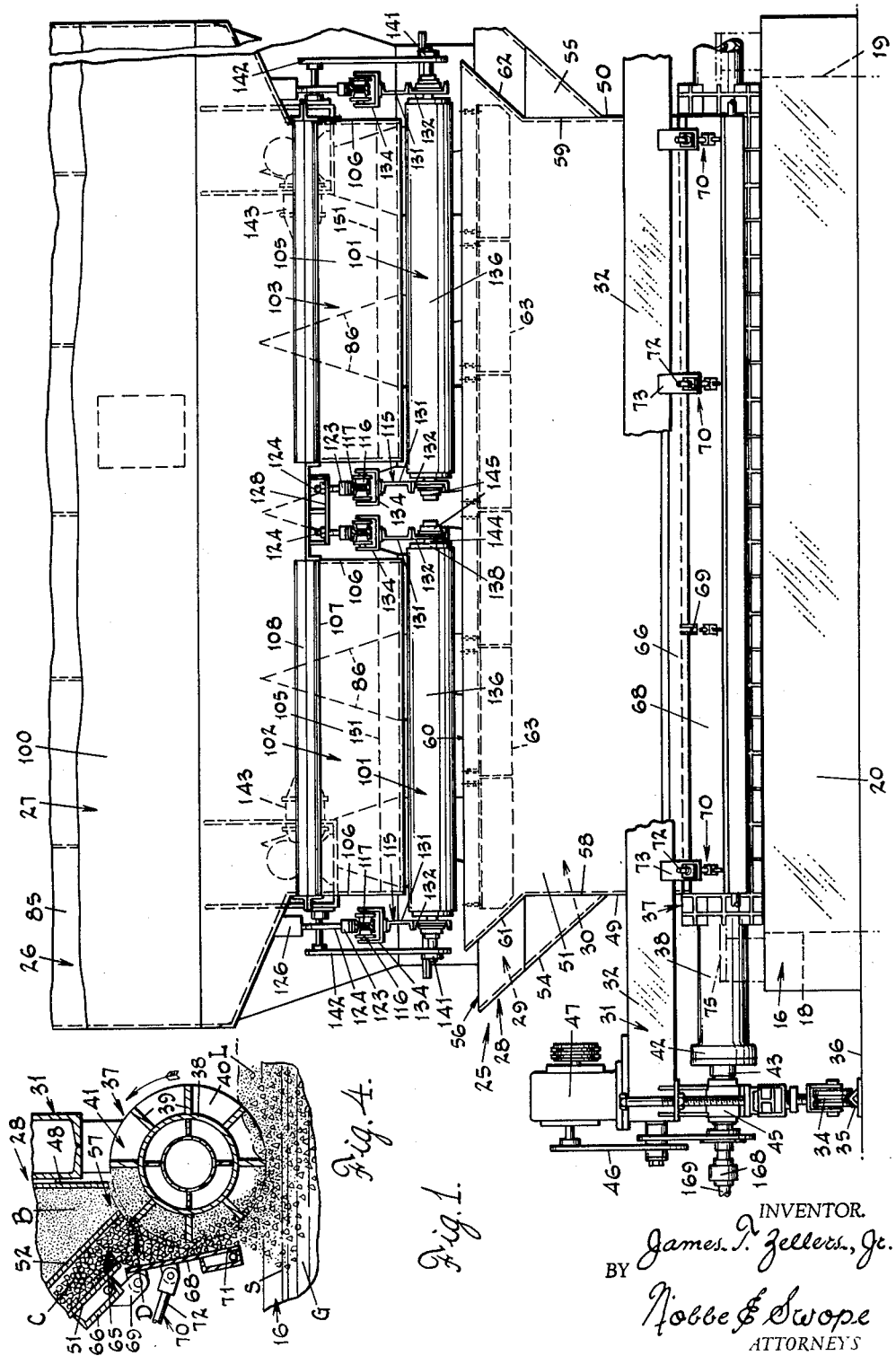
INVENTOR.
James T. Zellers, Jr.
BY
Nobbe & Swope
ATTORNEYS

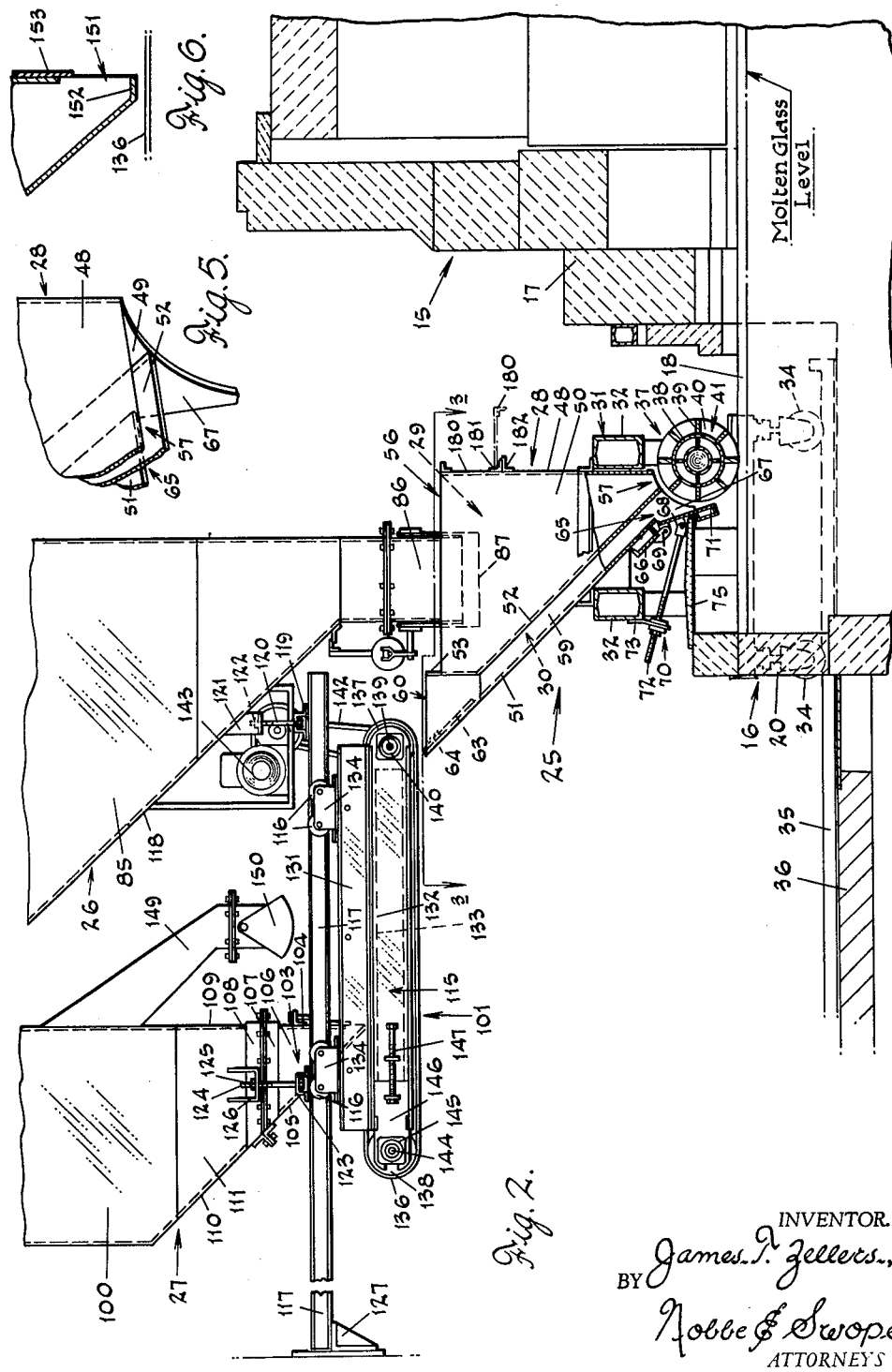

Jan. 26, 1965   J. T. ZELLERS, JR   3,167,191
GLASS BATCH FEEDING APPARATUS AND METHOD
Filed Nov. 13, 1962   3 Sheets-Sheet 3
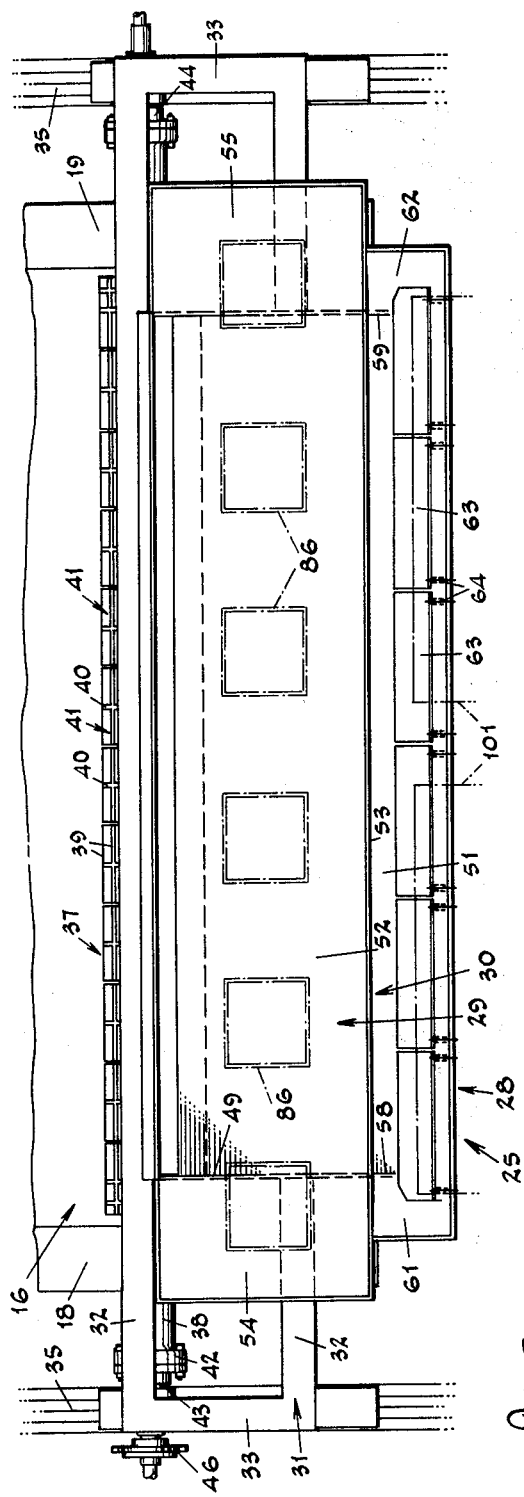
INVENTOR.
James T. Zellers, Jr.
BY
Nobbe & Swope
ATTORNEYS United States Patent Office 3,167,191
Patented Jan. 26, 1965

3,167,191
GLASS BATCH FEEDING APPARATUS
AND METHOD
James T. Zellers, Jr., Charleston, W. Va., assignor to
Libbey-Owens-Ford Glass Company, Toledo, Ohio, a
corporation of Ohio
Filed Nov. 13, 1962, Ser. No. 237,191
15 Claims. (Cl. 214—18)

The present invention relates broadly to the art of glass making and more particularly to an improved method of and apparatus for feeding measured quantities of different granular or finely divided materials such as raw glass making materials and cullet to the charging end of a melting furnace.

According to one manner of supplying batch materials to a tank furnace, broken or scrap glass, known as cullet, is fed into the doghouse or charging end of the furnace at a substantially continuous rate across substantially the width of the doghouse to provide a substantially evenly distributed layer on the surface of the body of molten glass confined by the walls of the doghouse. The raw pulverulent or granular glass making materials are delivered from a supply hopper to a continuously rotating, compartmented feed roll and deposited thereby on the layer or stratum of cullet to form a blanket-like layer of the combined batch materials. This blanket layer, extending substantially from one side wall of the doghouse to the opposite side wall thereof, is carried by the forwardly moving molten glass into the melting zone of the furnace.

As herein contemplated, the particles of glass cullet are fed onto the raw glass making materials substantially as they are received in measured quantities in the compartments of the feed roll in such a manner that the cullet is more or less directly mixed with the raw glass making materials. This enables a more effective proportionate measuring of the glass cullet relative to the raw materials to obtain a more intimate mixing of the cullet and raw materials as they are delivered as a blanket-like layer on the surface of the molten glass.

A principal object of the invention is to provide an improved method and apparatus for feeding glass batch materials in a manner to more effectively measure and intermix the glass cullet and raw glass making materials as they are delivered simultaneously to the charging end of a glass melting furnace.

Another object of the invention is to provide an improved method of the above character, in which the raw glass making materials are delivered to an elongated feed roll rotating about a substantially horizontal axis to carry the materials forwardly, the cullet then being deposited separately upon the raw glass making materials, with the cullet being compacted against the raw glass making materials upon continued rotation of said feed roll to effect the mixing thereof.

A further object of the invention is to provide improved feeding apparatus of the above character, including an elongated rotatable feed roll provided with a series of compartments, means for feeding raw glass making materials into the individual compartments of the roll as it rotates, means for separately feeding cullet upon the raw glass making materials, and means for compacting the cullet against the raw glass making materials as the said feed roll rotates to cause the mixing thereof during the feeding of the materials into the furnace.

A still further object of the invention is to provide improved feeding apparatus of the above character, including a compartmented delivery hopper for separately feeding raw glass making materials and cullet, received from supply bins located above said hopper, to the feed roll, the hopper and feed roll being mounted for horizontal movement as a unit relative to the furnace and to the supply bins to facilitate repair or replacement.

Other objects and advantages of the invention will become more apparent during the course of the following description when taken in connection with the accompanying drawings.

In the drawings, wherein like numerals are employed to designate like parts throughout the same:

FIG. 1 is an end elevation of feeding apparatus constructed in accordance with the present invention;

FIG. 2 is a side elevation of the feeding apparatus as viewed from the right in FIG. 1;

FIG. 3 is a horizontal view of the feeding apparatus taken on line 3—3 of FIG. 2;

FIG. 4 is an enlarged detail view of the discharge end of the feeding apparatus;

FIG. 5 is a fragmentary perspective view of the discharge end of the feeding apparatus;

FIG. 6 is a detail view of the cullet supply bin;

FIG. 7 is a longitudinal fragmentary detail view of the compartmented feed roll; and FIG. 8 is a transverse vertical detail section taken on line 8—8 of FIG. 7.

Referring now to the drawings, there is shown in FIGS. 1 and 2 a conventional glass melting tank furnace, designated in its entirety by the numeral 15, and including a charging end or doghouse 16 opening outwardly from the end wall 17 and defined by side walls 18 and 19, an end wall 20 and a bottom wall or floor (not shown). The batch feeding apparatus, constructed in accordance with the present invention and designated generally by the numeral 25, is disposed above the doghouse 16 with a source of supply of raw glass making material being indicated generally by the numeral 26 and source of supply of scrap or glass cullet being indicated by the numeral 27.

Briefly stated, the feeding apparatus 25 includes a compartmented delivery hopper 28 having a front compartment 29 for receiving the raw glass making materials and a rear compartment 30 for receiving the glass cullet. As viewed in FIGS. 1 and 2, the hopper 28 is supported on a framework 31 which is generally formed by front and rear horizontal beams 32 and end beams 33. The framework 31 is carried by wheels 34 so as to be movable inwardly and outwardly with respect to the doghouse 16. This permits the feeding apparatus 25 to be moved into close proximity to the furnace wall 17 if found desirable. For this purpose, the wheels 34 are adapted to traverse rails 35 secured to the structural floor 36 and arranged in parallel and suitably spaced relation to the doghouse side walls 18 and 19.

The framework 31 also mounts the rotatable feed roll or cylinder 37 which comprises a tubular core member 38 provided with a plurality of spaced longitudinally and radially extending vanes or blades 39 and annular connecting plates 40 that divide the spaces between the blades 39 into a plurality of substantially equally sized and circumferentially arranged compartments 41. The tubular core 38 of the feed roll is additionally formed with flanged ends 42 to which are bolted tubular supporting stub shafts 43 and 44. As viewed in FIG. 1, the shaft 43, and the shaft 44 in a similar manner, is journaled in a bearing 45 carried by the framework 31. The feed roll 37 is driven in a counter-clockwise direction as viewed in FIGS. 2 and 4 through a chain drive 46 from a motor 47 mounted on the framework.

Referring more particularly to the hopper 28, it comprises a substantially vertical front wall 48, side walls 49 and 50 and an inclined rear wall 51. The hopper 28 is provided with a partition wall 52 which is located inwardly of and parallel to the rear wall 51 thereby forming the respective front and rear compartments 29 and 30.

The partition wall 52 is provided along its upper marginal area with a substantially vertically disposed section 53. The front compartment 29, defined by the hopper forward wall 48, side walls 49 and 50 and partition 52 is of considerably larger volume than the rear compartment 30. The side walls 49 and 50, defining the compartment 29, are also formed with upwardly and outwardly flared sections 54 and 55 to increase the length of the compartment and thus afford an upper receiving opening 56 of relatively large dimension. The downwardly convergent position of the partition 52 in relation to the front wall 48 creates for this compartment a lower open end or discharge outlet 57 of considerably smaller dimensions and the raw pulverulent batch materials are discharged through the outlet 57 into the compartment 41 of the feed roll 37 as it rotates therebeneath.

The rear compartment 30, on the other hand, is defined by the rear hopper wall 51, partition wall 52 and marginal end portions 58 and 59 of side walls 49 and 50. The compartment 30 has a relatively smaller upper receiving opening 60 defined by the upper end of rear wall 51, the vertically disposed end section 53 of partition 52 and the upwardly and outwardly flared end extensions 61 and 62 of the side walls. Upon reference to FIG. 1, the outwardly flared extensions 54 and 55 as well as the extensions 61 and 62 of the respective compartments 29 and 30 serve to prevent lateral flow or loss of the batch materials falling from the supply sources or bins 26 and 27 and direct the same into the respective compartments. To reduce wearing of the upper marginal area of the rear wall 51 by the substantially rough edged particles of cullet one or more transversely arranged, replaceable metal plates 63 may be suspended by chains 64 having ends hooked over the upper edge of the wall.

As viewed in FIGS. 2 and 4 there is secured to the lower end of the rear wall 51, adjacent outlet opening 65 of the rear compartment 30, a channel member 66 which serves as a reinforcement therefor and additionally provides a sealed chamber through which a coolant, such as water, can be circulated if desired to maintain the lower end of wall 51 at a relatively cool temperature. This serves to reduce the possibility for particles of cullet to be softened by any heated condition of the wall and to become adhered thereto. It can also be seen in FIG. 5 that the side wall 49, and in like manner, the side wall 50 of the hopper extends downwardly beneath the respective discharge outlet 57 and 65 to afford an extension or shield 67 to prevent undesired endwise escape and loss of the batch materials as they are directed into the doghouse.

As more clearly seen in FIG. 4, the raw glass making materials, designated by the letter B, are discharged from the hopper outlet 57 and received in the several compartments 41 arranged in longitudinal rows along the length of the feed roll 37 rotating therebeneath. As the compartments are filled and moved beyond the outlet 57, the glass cullet designated by the letter C, is discharged from the outlet 65 onto and against the outer surface of the raw batch materials B in each of the roll compartments. The proportionate amount of glass cullet added to the raw batch materials in the compartments 41 of feed roll 37 is controlled by the provision of a gate or adjustably mounted gage plate 68 that cooperates with the feed roll to define a discharge area, designated by the letter D.

The gage plate 68 is adjustably mounted with respect to the feed roll 37 to suitably control the quantity of glass cullet discharged with the raw batch materials to form a blanket-like layer L of the combined batch materials on the upper surface or stratum S of the body of molten glass G in the furnace doghouse 16. As positioned in FIG. 4, the gage plate 68 is inclined in converging relation to the feed roll 37 in which position it progressively reduces the volume of area D. This operates to force and compact the cullet against the raw batch materials contained in each feed roll compartment 41. In fact, it has been observed that particles of cullet are so combined with and mixed through the raw batch materials that they are often present in the upper surface of the blanket-like layer L. While it is, of course, true that the relatively heavier cullet will tend to move toward the lower stratum of the layer, the improved manner herein provided of feeding the batch materials has materially increased the rate at which the batch materials are reduced to a molten condition in the furnace. The area of the molten glass in the doghouse outwardly of the feed roll is covered by a cover tile 75 supported upon the side walls and back wall of the doghouse.

For mounting the gage plate 68, pairs of hinges 69 are suitably spaced along and attached to the channel member 66 and fixed to the rear surface of the gage plate 68 to swingably support the same. To adjust the position of gage plate 68, and adjusting screw arrangement 70 is provided to vary the angular position of the plate and thereby the actual distance that the lower marginal edge 71 thereof is disposed from the feed roll 37. Each screw arrangement 70 includes a threaded rod 72 carried by the gage plate 68 and passing through a strap 73 fixed to the framework 31; lock nuts being provided on each side of the strap. The position of the gage plate determines the amount of cullet discharged with the raw batch materials. Since the amount of cullet supplied to the tank furnace is accurately proportioned to a measured amount of raw batch materials to be combined therewith, it will be appreciated that the actual open area defined by the lower edge 71 of the gage plate is quite critical.

As shown in FIG. 1 the source 26 from which the raw batch materials are supplied to the front compartment 29 of hopper 28 comprises a chute-type bin 85 formed at its lower end with spaced downwardly truncated terminal portions 86 adapted to be opened and closed by suitably operated gates or valve plates 87. As viewed in FIG. 2, the terminal end portions 86 are located below the open upper end 56 of the front compartment 29 of hopper 28 to discharge the raw batch materials therein.

The supply source 27 for the glass cullet includes a bin structure 100 beneath which are mounted horizontal endless conveyors, generally designated by the numeral 101, adapted to receive the cullet from the lower discharge end of the bin and convey it to a point at which it is discharged into the open upper end 60 of the rear compartment 30 of hopper 28. Generally speaking, the cullet supply bin 100 is constructed to provide at least two points of discharge to permit lateral control of the glass cullet as it is supplied to the rear compartment 30. Additionally, by the provision of two discharge outlets with a complementary number of endless conveyors, it is possible to control the amount of cullet discharged at one side or the other of the longitudinal center line of the furnace doghouse. As a result a monitoring control can be effected to produce the desired rate and/or direction of flow of the blanket-like layer of combined batch materials as they are carried forwardly on the upper surface of the body of molten glass as it moves from the doghouse into the melting zone of the furnace.

The supply bin 100 is thus provided with similarly constructed lower discharge ends 102 and 103 formed with forward walls 104, rear walls 105 and side walls 106. These walls are provided at their upper ends with structural bracing members 107 secured to like structural bracing members 108 carried by the complementary and adjoining lower ends of the bin walls 109, 110 and 111.

Each conveyor 101 comprises a mobile frame 115 movably supported by wheels 116 which run along transversely spaced pairs of rails 117. As shown in FIGS. 1 and 2 each rail 117 is provided at its end adjacent supply bin 85 with a bracket 119 to which is fixed a vertically disposed threaded rod 120. The rod 120 passes upwardly through a bracket 121 fixed to the rear wall 118 of hopper 85 and is provided with an adjusting nut 122. In like manner each rail 117 is provided with a bracket 123 having a threaded rod 124 which extends upwardly through a bracket 126 carried by the wall 111 of hopper 100 and has threaded thereupon a nut 125. As shown in FIG. 2, the outer ends of the rails are supported upon bracket 127 and the rails may be of sufficient length to permit the conveyors to be moved away from the furnace for repair or replacement. It will also be noted in FIG. 1 that the centrally disposed rails 117 between the bin discharge ends 102 and 103 are supported by brackets 128. By means of the threaded rods 120 and 124 and the associated nuts 122 and 125, the rails 117 can be leveled with respect to one another in the vertical plane as well as the horizontal plane.

The supporting frame 115 for each conveyor 101 comprises channel members 131 and 132, arranged one above the other, and cross-bracing members 133. The upper channel member 131 at each side of the frame is provided on its upper surface with spaced bearing brackets 134 in which the wheels 116 are journaled, a pair of wheels being supported by the brackets on each side of the rail 117.

Each conveyor includes a horizontally disposed, endless belt 136 trained at its opposite ends about a drive roll 137 and idler roll 138; the upper horizontal flight of the belt providing the cullet receiving surface. The drive roll 137 is provided with a support axle 139 journaled in fixed bearings 140 carried by the channel members 132. One end of axle 139 carries a sprocket 141 which is operatively connected to the power source 142 by a chain drive 143. The axle 144 of idler roll 138 is journaled at its opposite ends in bearings 145 mounted on slide plates 146 adjustably carried by channel members 132. By means of screws 147, the plates 146 can be shifted relative to the channel members to adjust the tension of the conveyor belt 136. By controlling the speed of the conveyors 101, the rate of cullet delivery to either side of the center of the rear compartment 30 of hopper 29 can be regulated as desired.

In the event of temporary, inadvertent stoppage in the discharge ends 102 or 103 of supply bin 100, or during the initial filling of the tank furnace with batch materials, when the measured rate of supply afforded by the discharge ends is not required, the supply of cullet to the conveyor belts 136 can be obtained through one, or more, auxiliary chutes 149 normally closed by gates 150. Also in order to prevent undesired rearward spilling of the glass cullet, the outlet openings 151 of the discharge ends 102 and 103 are formed with lower forwardly directed lips 152 which serve to deposit the glass cullet on the respective conveyor belt 136 as it moves forwardly. Otherwise, cullet might accumulate behind the discharge ends of the bin and would be eventually carried forward beneath the same with resultant tearing or damaging of the belt. As shown in FIG. 6, each of the outlet openings 151 is adapted to be regulated or entirely closed by a vertically movable plate 153.

Referring to FIGS. 7 and 8, there is shown the manner of directing a coolant, such as water, through the feed roll 37 to maintain it at the desired temperature. For this purpose, the core member 38 of the feed roll is provided with an elongated tubular insert 160 having radially extending fins 161 which divide the interior of the core member 38 into a plurality of radially arranged chambers 162 through which the coolant, such as water under pressure, is pumped to contact the inner surface of the core member and thus to withdraw heat therefrom. The opposite ends 163 of the tubular insert are conical and terminate inwardly of the ends of the core member 38. The outer ends of the fins 161 are received in radially spaced slots 164 formed in the inwardly directed surfaces 165 of the flanged ends 166 of the tubular stub shafts 43 and 44; said flanged ends being secured to the respective ends 42 of the core member 38 by bolts 167. As shown in FIG. 1, the shaft 43 is connected through swivel joint 168 to a pipe 169 leading to a source of supply of coolant. The coolant directed through the bore of shaft 43 flows through the chambers 162 between the tubular insert and core member thereby absorbing heat from the core member and, upon reaching the opposite end thereof, is exhausted through the bore of shaft 44.

As shown in FIG. 2, the upper margin of the front wall 48 of hopper 28 is provided with a swingably mounted section 180 carried by hinges 181 supported on a brace 182 fixed to the lower stationary section of the wall 48. Accordingly, when the feeding apparatus 25 is to be bodily removed, the hinged section 180 is released from its normal position, shown in full line in FIG. 2, to a lowered position, indicated in broken line, thereby creating an unobstructed open area which will permit the hopper 28 to pass beneath the terminal end portions 86 of bin 85 as the apparatus 25 is moved bodily outwardly or inwardly thereunder.

It is to be understood that the form of the invention herewith shown and described is to be taken as a preferred embodiment of the same, and that various changes in the shape, size and arrangement of parts may be resorted to without departing from the spirit of the invention.

I claim:

1. Apparatus for feeding and mixing measured quantities of different granular or finely divided materials such as raw glass making materials and cullet to the charging end of a melting furnace, comprising, in combination, an elongated rotatable feed roll provided with a series of compartments arranged longitudinally and circumferentially of said roll, means for rotating said roll about its longitudinal axis, means for feeding raw glass making materials into the individual compartments of the roll as said roll rotates, means for separately feeding cullet upon the raw glass making materials in said compartments, and means for compacting the cullet against the raw glass making materials as the said feed roll rotates to cause a mixing thereof during the feeding of the materials into the furnace.

2. Apparatus as defined in claim 1, in which the means for compacting the cullet comprises a gage plate mounted opposite the feed roll and defining therewith a passage therebetween.

3. Apparatus as defined in claim 1, in which the means for separately feeding cullet upon the raw glass making materials comprises a hopper having an outlet at its lower end located in proximity to said feed roll, an endless belt having a substantially horizontal cullet receiving surface, means for feeding cullet upon said receiving surface, and means for driving said belt to deliver the cullet to said hopper.

4. Apparatus as defined in claim 3, in which the means for compacting the cullet comprises a gage plate mounted beneath the hopper outlet and opposite the feed roll to define therewith a passage therebetween.

5. Apparatus for feeding and mixing measured quantities of different granular or finely divided materials such as raw glass making materials and cullet to the charging end of a melting furnace, comprising, in combination, a rotatable feed roll provided with a series of compartments arranged longitudinally and circumferentially of said roll, means for rotating said roll about its longitudinal axis, a hopper having a front wall, opposite side walls and an inclined rear wall, an inclined partition wall in said hopper substantially parallel to but spaced from said inclined rear wall to provide front and rear compartments, each compartment being provided at its lower end with an outlet positioned in proximity to the feed roll, means for feeding raw glass making materials into the front compartment, from which they pass into the compartments of said rotating feed roll, means for feeding cullet into the rear compartment, and a gage plate positioned beneath the outlet of said rear compartment and cooperating with said rotating feed roll to regulate the amount of cullet being mixed with the raw glass making materials.

6. Apparatus as defined in claim 5, including means for adjustably mounting the gage plate for movement toward and away from said feed roll.

7. Apparatus as defined in claim 5, in which the means for feeding the cullet to the rear compartment of said hopper comprises an endless belt having a substantially horizontal cullet receiving surface, means for feeding cullet upon said receiving surface, and means for driving said belt to deliver the cullet into said rear compartment.

8. Apparatus as defined in claim 7, including means for mounting said endless belt for horizontal bodily movement toward and away from said hopper.

9. Apparatus as defined in claim 8, including means for mounting said feed roll and hopper for bodily movement as a unit horizontally relative to said endless belt.

10. Apparatus as defined in claim 7, including means for mounting said endless belt for horizontal bodily movement toward and away from said hopper, and means for mounting said feed roll and hopper for bodily movement as a unit horizontally relative to said endless belt.

11. Apparatus as defined in claim 5, in which the means for feeding the cullet to the rear compartment of said hopper comprises a pair of endless belts positioned side by side and each having a substantially horizontal cullet receiving surface, means for feeding cullet upon the receiving surfaces of said belts, and means for driving the belts independently of one another.

12. Apparatus as defined in claim 11, including means for mounting said endless belts for horizontal bodily movement toward and away from said hopper independently of one another.

13. Apparatus as defined in claim 11, including means for mounting said feed roll and hopper for horizontal bodily movement as a unit relative to said endless belts.

14. Apparatus as defined in claim 11, including means for mounting said endless belts for horizontal bodily movement toward and away from said hopper independently of one another, and means for mounting said feed roll and hopper for horizontal bodily movement as a unit relative to said endless belts.

15. In a method of feeding measured quantities of raw glass making materials and cullet onto the molten glass in the charging end of a glass melting furnace, the steps of rotating a compartmented cylindrical surface about its longitudinal axis and depositing raw glass making materials into the compartments from a stationary source past which the compartments move, separately depositing glass cullet upon the raw glass making materials in said compartments, compacting the cullet into the raw glass making materials upon continued rotation of the cylindrical surface to cause the mixing thereof, and depositing the raw glass making materials and cullet on the molten glass in a continuous layer.

References Cited by the Examiner
UNITED STATES PATENTS

| | | | |
|---|---|---|---|
| 781,150 | 1/05 | Lindquist | 198—126 X |
| 2,114,545 | 4/38 | Slayter | 65—21 |
| 3,074,568 | 1/63 | Mambourg et al. | 214—18 |